United States Patent
Igarashi

[11] Patent Number: 5,853,438
[45] Date of Patent: Dec. 29, 1998

[54] FILTER REGENERATING MECHANISM FOR EXHAUST BLACK SMOKE REMOVING SYSTEM

[75] Inventor: Tatsuki Igarashi, Hino, Japan

[73] Assignee: Hino Motors, Ltd., Tokyo, Japan

[21] Appl. No.: 856,305

[22] Filed: May 14, 1997

[30] Foreign Application Priority Data

May 24, 1996 [JP] Japan .................................. 8-130005

[51] Int. Cl.$^6$ .............................. F01N 3/02; B01D 39/20
[52] U.S. Cl. ........................ 55/302; 55/287; 55/DIG. 10; 55/DIG. 30; 60/296; 60/311
[58] Field of Search ................... 55/282.3, 287, 55/302, 385.3, 417, 431, 466, 482.1, DIG. 10, DIG. 30; 60/296, 303, 311

[56] References Cited

U.S. PATENT DOCUMENTS

| | | | |
|---|---|---|---|
| 4,494,375 | 1/1985 | Rao et al. | 55/DIG. 10 |
| 4,544,388 | 10/1985 | Rao et al. | 55/282.3 |
| 4,549,399 | 10/1985 | Usui et al. | 55/DIG. 30 |
| 4,833,883 | 5/1989 | Oda et al. | 55/302 |
| 4,902,309 | 2/1990 | Hempenstall | 55/DIG. 10 |
| 5,082,478 | 1/1992 | Oono et al. | 55/DIG. 10 |

*Primary Examiner*—C. Scott Bushey
*Attorney, Agent, or Firm*—McCormick, Paulding & Huber

[57] ABSTRACT

A filter regenerating mechanism for a reverse-cleaning regenerative exhaust black smoke removing system, wherein the air injection quantity is reduced, and the filter regenerating effect is improved to reduce a pressure loss due to the filter. Each time exhaust gas is passed through the filter for a predetermined period of time, a solenoid valve is opened for an extremely short period of time, thereby allowing compressed air to be supplied into an exhaust chamber through the solenoid valve, an air nozzle, etc. so as to flow in a direction reverse to the flow direction of exhaust gas. Particulates deposited on the wall surfaces of first passages in the filter are removed therefrom by the action of pressure waves and cleaning air stream produced upon opening of the solenoid valve, and gravitationally drop into a hopper where they are incinerated. A perforated plate having a large number of small holes is disposed between the air nozzle and an outlet surface of the filter. The perforated plate allows a stream of air jetted out from the air nozzle to be rectified and diffused through the small holes and sprayed in the form of a wide stream over the whole filter outlet surface substantially uniformly. Further, pressure waves produced upon opening of the solenoid valve are allowed to act on the whole outlet surface by the perforated plate.

5 Claims, 4 Drawing Sheets

FILTER REGENERATING MECHANISM FOR EXHAUST BLACK SMOKE REMOVING SYSTEM

BACKGROUND OF THE INVENTION

The present invention relates to a filter regenerating mechanism for use in a reverse-cleaning regenerative exhaust black smoke removing system for diesel engines. More particularly, the present invention relates to a cleaning air supply mechanism for an exhaust black smoke removing system, whereby the filter regenerating effect of cleaning air injection is improved to reduce both the cleaning air injection quantity and a pressure loss due to the filter.

There have been proposed various exhaust black smoke removing systems using a gas-permeable porous filter for trapping and incinerating particulates (soot) in exhaust gas discharged from diesel engines. FIG. 1 is a schematic view for describing the principle of a cross-flow filter for trapping particulates in exhaust gas. The cross-flow filter is known, for example, from JP-B2-5-63604 (Japanese Patent Publication No. 5-63604).

The cross-flow filter as shown in FIG. 1 has a filter block 10 consisting essentially of a multiplicity of rectangular filter plates 11 made of a gas-permeable porous ceramic material having a filter function, which are stacked in a rectangular parallelepiped configuration. Each filter plate 11 has a first passage 14 formed from a large number of through-holes 15, both ends of which are open. Each pair of adjacent filter plates 11 are separated from each other by spacers 22 to define a thin rectangular parallelepiped-shaped second passage 24 between the two filter plates 11.

Exhaust gas containing particulates, which is discharged from a diesel engine, is introduced into the first passages 14 from openings provided in inlet surfaces 12, as shown by the arrow E in FIG. 1. The exhaust gas is prevented from flowing out from particulate discharge surfaces 13. Consequently, the exhaust gas passes through the gas-permeable porous ceramic material constituting the filter plates 11 and further passes through the second passages 24 to flow out from gas outlet surfaces 23. Particulates of large diameter in the exhaust gas cannot pass through the ceramic material; therefore, these particulates are deposited on the wall surfaces of the first passages 14 and thus removed from the exhaust gas, and only dedusted exhaust gas H is discharged from the gas outlet surfaces 23.

After exhaust gas has been passed through the first and second passages 14 and 24 for a predetermined period of time, cleaning air is passed for a short period of time (momentarily) in a direction reverse to the flow direction of exhaust gas, that is, from the second passages 24 to the first passages 14 through the gas-permeable porous material, thereby removing the deposited particulates from the wall surfaces of the first passages 14, and thus regenerating the filter by reverse cleaning. The particulates removed from the wall surfaces drop through the first passages 14 by gravity, as shown by the arrow P in FIG. 1, and enter a hopper (not shown) under the particulate discharge surfaces 13. The particulates are incinerated in the hopper.

FIG. 2 is a plan view schematically showing a conventional exhaust black smoke removing system using a filter 20 consisting essentially of four filter blocks 10. FIG. 3 is a longitudinal vertical sectional view of the system shown in FIG. 2. In the system shown in FIGS. 2 and 3, two filter blocks 10 are disposed on each side of a partition plate 69 lying in the longitudinal direction of the system, and held by a frame 28 through retainers 43. Dust-containing exhaust gas E discharged from a diesel engine enters an inlet chamber 62 through an exhaust inlet pipe 57. In the inlet chamber 62, the exhaust gas E is guided to the inlet surfaces 12 of the four filter blocks 10 and passed through the filter to remove particulates therefrom, thus becoming dedusted exhaust gas H, which is then discharged through exhaust outlet pipes 58, exhaust valves 92, etc.

In the conventional exhaust black smoke removing system shown in FIGS. 2 and 3, reverse cleaning of the filter is carried out as follows: After dust-containing exhaust gas E has been passed through the filter for a predetermined period of time, one exhaust valve 92 is closed, and a solenoid valve 84 for an air pipe 82 communicating with the exhaust outlet pipe 58 having the exhaust valve 92 closed is opened for a short period of time. The air pipe 82 is communicated with an air tank of 6–8 kg/cm$^2$. Thus, compressed air is jetted into the exhaust outlet pipe 58 through the solenoid valve 84 and an air nozzle 75. The compressed air flows through a path reverse to that of exhaust gas. That is, the compressed air passes through the second passages 24 of the filter blocks 10 and further passes through the gas-permeable porous material to enter the first passages 14, thereby removing deposited particulates from the peripheral wall surfaces of the first passages 14 in cooperation with the effect of pressure waves produced from the air nozzle 75. Thus, the filter is regenerated by reverse cleaning. Particulates dropping into a hopper 68 are incinerated by heat from an ignition heater 66 provided in the hopper 68.

In order to prevent the filter reverse cleaning process from interfering with the overall discharge of exhaust gas from the diesel engine, the two exhaust valves 92 are alternately closed so that either of the exhaust outlet pipes 58 is open at all times. This type of exhaust black smoke removing system is known from JP-B2-5-63604 and JP-U-5-58812 (Japanese Utility Model Public Disclosure No. 5-58812).

FIGS. 4A and 4B show a conventional filter 110 consisting essentially of a honeycomb cylindrical member having a plurality of first cells 106 and second cells 108, which are divided by partitions 102 made of a gas-permeable porous material. FIG. 4A is an end view of the filter 110 (showing an inlet surface 112). FIG. 4B is a sectional view taken along the axis of the filter 110. As shown in FIG. 4A, at the filter inlet surface 112, the end surface of each of the second cells 108, which are disposed in a checkered pattern, is closed with a sealant 105 to prevent exhaust gas E from flowing into the second cells 108, while exhaust gas E is allowed to flow into the first cells 106, each lying between the second cells 108 and not closed with a sealant. At an outlet surface 123 formed at the other end of the filter 110, the end surface of each first cell 106 is closed with a sealant 107 to prevent exhaust gas E from flowing out of the first cells 106, while the end surface of each second cell 108 is open.

Exhaust gas E introduced into the filter 110 from the inlet surface 112 of the filter 110, shown in FIGS. 4A and 4B, flows successively through the first cells 106, the gas-permeable porous material lying between the first and second cells 106 and 108, the second cells 108, and the outlet surface 123. Particulates in the exhaust gas E are trapped by the wall surfaces of the first cells 106 and thus removed from the exhaust gas E. Dedusted exhaust gas H flows out from the outlet surface 123. This type of exhaust black smoke removing system is known from JP-A-57-35918 (Japanese Patent Public Disclosure No. 57-35918).

The filter of the exhaust black smoke removing system as shown in FIGS. 4A and 4B is regenerated in the same way as in the case of the systems as shown in FIGS. 2 and 3. That is, after dust-containing exhaust gas E has been passed through the filter 110 for a predetermined period of time, compressed air is supplied through a path reverse to that of the exhaust gas E. That is, the compressed air flows successively through the outlet surface 123 of the filter 110, the second cells 108, the gas-permeable porous material, and the first cells 106. Thus, particulates deposited on the wall surfaces of the first cells 106 are removed therefrom by the effect of a jet of compressed air and pressure waves and allowed to drop into a hopper (not shown), thereby regenerating the filter. Particulates dropping into the hopper are incinerated therein.

In the conventional reverse-cleaning regenerative exhaust black smoke removing systems shown in FIGS. 2 to 4B, particulates are incinerated in a hopper disposed away from the filter. Therefore, heat of incineration of particulates is not directly applied to the filter, and the filter is not subjected to heat load. Moreover, ash resulting from the incineration of particulates will not accumulate in the filter. This makes it possible to increase the lifetime of the filter. However, it is difficult to sweep particulates completely from the whole filter. Therefore, particulates remain locally in the filter, causing the filter pressure loss to increase, and it is necessary to increase the cleaning air injection quantity.

Further, the conventional reverse-cleaning regenerative exhaust black smoke removing systems need to increase the distance D (see FIG. 2) between the air nozzle and the filter outlet surface in order to apply the pressure waves and compressed air stream from the air nozzle to the whole of the filter having a relatively large longitudinal dimension L (see FIG. 3). The relationship between the dimension L and the distance D, which enables effective reverse-cleaning regeneration, is experimentally known to be D>0.11L. A conventional system as shown in FIG. 2, in which an air nozzle is disposed at a side of the filter, suffers from the problem that an increase in the distance D causes an increase in the width of the system (i.e. the dimension in a horizontal direction perpendicular to the longitudinal direction). Making it difficult to mount the system on a vehicle.

SUMMARY OF THE INVENTION

An object of the present invention is to provide a cleaning air supply mechanism for an exhaust black smoke removing system, which is designed so that the filter regenerating effect of cleaning air injection is improved to reduce both the air injection quantity and the filter pressure loss, thereby improving the disadvantages of the conventional reverse-cleaning regenerative exhaust black smoke removing systems. In the reverse-cleaning regeneration of a filter, particulates are removed from the wall surfaces of first passages and moved into a hopper by a synergistic effect of pressure waves and a jet of compressed air produced from an air nozzle. More specifically, first, the filter is vibrated by the pressure waves produced from the air nozzle, and particulates in the filter are separated from a porous material constituting the filter. Then, the particulates are carried away from the filter by a jet of air. Therefore, it is necessary in order to further improve the effect of reverse-cleaning regeneration to enable the pressure waves and air jet to be uniformly applied to the whole filter. Accordingly, an object of the present invention is to enable the pressure waves and air jet produced from the air nozzle to be uniformly applied to the whole filter.

In general, the air nozzle has an opening of diameter 20 mm to 30 mm, which is much smaller than the area of the filter outlet surface. Therefore, it has heretofore been necessary to considerably increase the distance between the air nozzle and the filter outlet surface in order to enable cleaning air jetted out from the air nozzle to be sprayed on the whole filter outlet surface. For this reason, the overall size of the conventional system becomes undesirably large. Accordingly, an object of the present invention is to provide a filter regenerating mechanism which need not to increase the distance between the air nozzle and the filter outlet surface.

Another object of the present invention is to provide a filter regenerating mechanism for an exhaust black smoke removing system, which is designed so that the effect of filter regeneration by cleaning air injection is improved to minimize the amount of particulates remaining in the filter in the filter cleaning process, thereby enabling a reduction in the cleaning air injection quantity.

Other objects and advantages of the present invention will become apparent from the following description.
(Means for Solving the Problems)

In a filter regenerating mechanism for an exhaust black smoke removing system according to the present invention, a filter made of a gas-permeable porous material has a plurality of first passages extending between an inlet surface and a particulate discharge surface, and a plurality of second passages extending between the first passages and opening on an outlet surface. Exhaust gas discharged from a diesel engine flows successively through an exhaust inlet pipe, an inlet chamber, the filter inlet surface, the first passages, the gas-permeable porous material lying between the first and second passages, the second passages, the outlet surface, an exhaust chamber, and an exhaust outlet pipe. Consequently, particulates in the exhaust gas are deposited on the wall surfaces of the first passages. Cleaning air is supplied to flow in a direction reverse to the flow direction of the exhaust gas, thereby removing the deposited particulates from the wall surfaces of the first passages. The removed particulates drop into a hopper where they are incinerated. Thus, the filter is regenerated.

The filter regenerating mechanism according to the present invention has a cleaning air-supplying air nozzle opening toward approximately the center of the filter outlet surface, and an air injection valve for injecting cleaning air into the air nozzle. The filter regenerating mechanism further has a perforated plate disposed between the air nozzle and the outlet surface so as to cover the outlet surface. The perforated plate has a large number of small holes of diameter about 5 mm and is adapted to reflect and rectify pressure waves produced upon opening of the air injection valve so that the pressure waves act on the filter outlet surface substantially uniformly. Moreover, the perforated plate rectifies a stream of cleaning air so that the air stream acts on the outlet surface substantially uniformly.

Preferably, the filter includes a plurality of filter blocks disposed on each side of a partition plate. The perforated plate has a first projection projecting toward the opening of the air nozzle, and two second projections projecting toward the air nozzle from respective positions in the vicinities of opposing edges of the outlet surface. The first projection has a first and second slant surfaces having approximately symmetric cross-sections. Each second projection has a third slant surface closer to the first projection and a fourth slant surface closer to an edge of the outlet surface. A lower end of the first slant surface is connected to a lower end of the third slant surface adjacent to the first slant surface, and a lower end of the second slant surface is connected to a lower end of the third slant surface adjacent to the second slant surface. A lower end of each fourth slant surface is connected to that edge of the outlet surface which is adjacent to the fourth slant surface.

A portion of each of the first and second slant surfaces which faces opposite to the air nozzle and has a predetermined radius is defined as a non-perforated portion having an opening ratio of approximately 0%, and the remaining portion of the perforated plate is provided with a large number of holes having a predetermined diameter. Those portions of the first and second slant surfaces which are outside the non-perforated portion, together with the fourth slant surfaces, each have an opening ratio lower than an opening ratio of the third slant surfaces. Those portions of the first and second slant surfaces which are outside the non-perforated portion, together with the fourth slant surfaces, each have an opening ratio of about 10%, and the third slant surfaces have an opening ratio of about 60%.

In another form of the present invention, a filter regenerating mechanism for an exhaust black smoke removing system includes a filter made of a gas-permeable porous material. The filter has a plurality of first passages extending parallel from an inlet surface, and a plurality of second passages extending between the first passages and opening on an outlet surface. Exhaust gas flows successively through an exhaust inlet pipe, an inlet chamber, the filter inlet surface, the first passages, the gas-permeable porous material lying between the first and second passages, the second passages, the outlet surface, an exhaust chamber, and an exhaust outlet pipe. Consequently, particulates in the exhaust gas are deposited on the wall surfaces of the first passages. Cleaning air is supplied to flow in a direction reverse to the flow direction of the exhaust gas, thereby removing the deposited particulates from the wall surfaces of the first passages. The removed particulates drop into a hopper where they are incinerated.

The filter regenerating mechanism has a hopper communicated with the bottom of the exhaust chamber. An air nozzle is provided to open toward the filter outlet surface. The filter regenerating mechanism further has an air injection valve for injecting cleaning air into the air nozzle, and a perforated plate parallel to the filter outlet surface. A portion (central portion) of the perforated plate which faces opposite to the air nozzle and lies within a predetermined radius is defined as a non-perforated portion having an opening ratio of approximately 0%, and an annular portion, which lies outside the non-perforated portion and a predetermined distance inward of the outer periphery of the perforated plate, is provided with a large number of small holes having a diameter of about 5 mm. Preferably, the filter is in the shape of a cylinder having an axis parallel to the first passages, and the inlet and outlet surfaces are circular planes perpendicular to the axis. Further, the annular portion has an opening ratio of 50%.

DETAILED DESCRIPTION OF THE PREFERRED EMBODIMENTS

Figure 1:
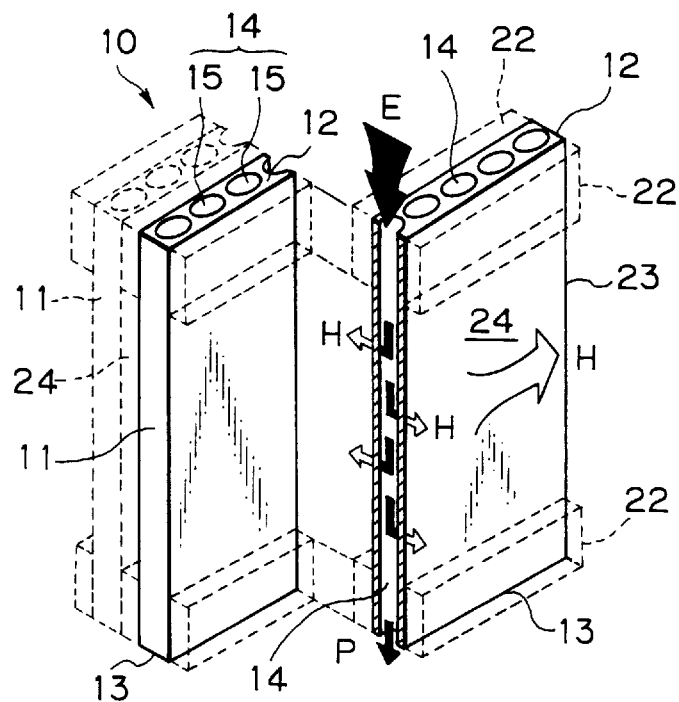
FIG. 1 is a schematic view for describing the principle of a cross-flow filter.
Figure 2:
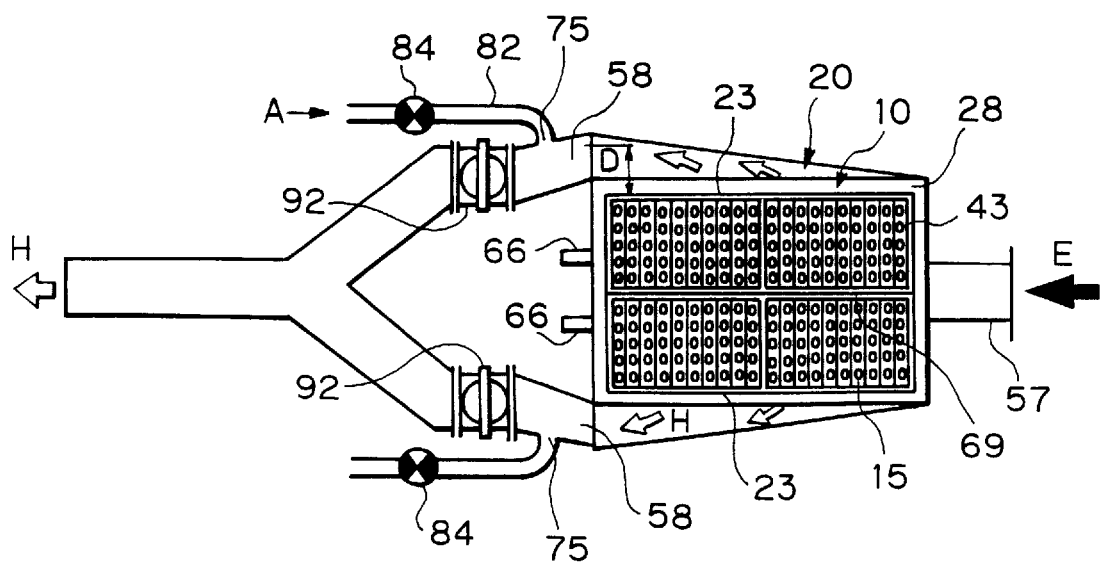
FIG. 2 is a plan view schematically showing a conventional exhaust black smoke removing system.
Figure 3:
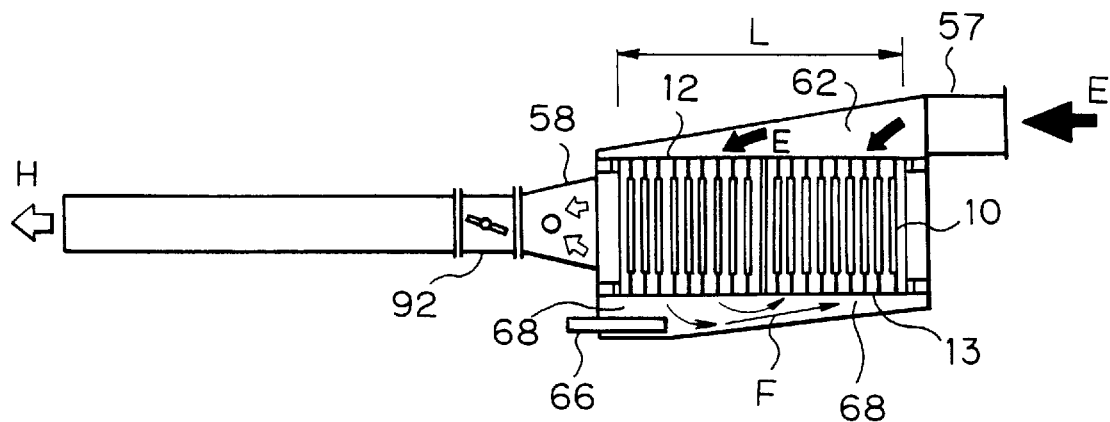
FIG. 3 is a longitudinal vertical sectional view of the conventional system shown in FIG. 2.
Figure 4A:
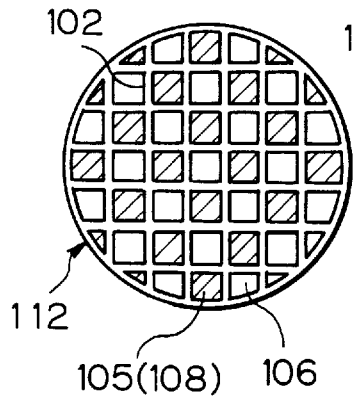
FIG. 4A is an end view showing a conventional filter consisting essentially of a honeycomb cylindrical member.
Figure 4B:
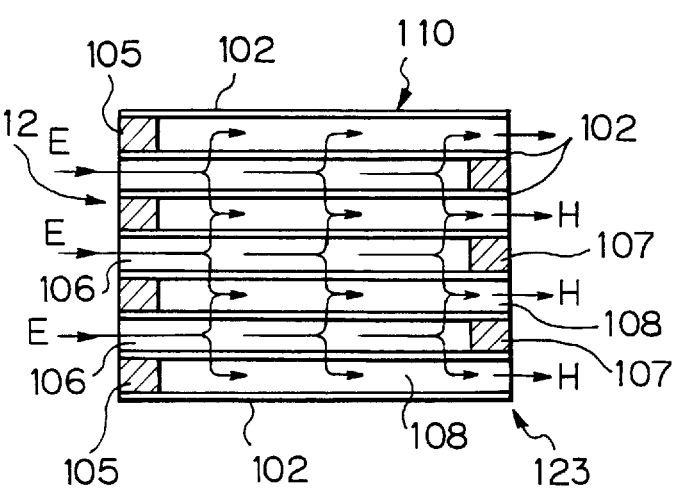
FIG. 4B is a sectional view taken along an axis of the conventional filter shown in FIG. 4A.
Figure 5A:
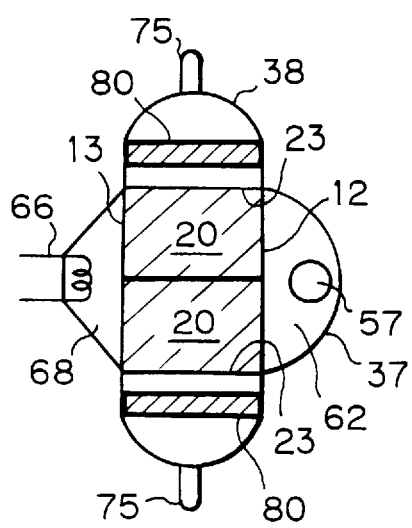
FIG. 5A is a longitudinal vertical sectional view schematically showing a filter regenerating mechanism for an exhaust black smoke removing system using a cross-flow filter according to an embodiment of the present invention.
Figure 5B:
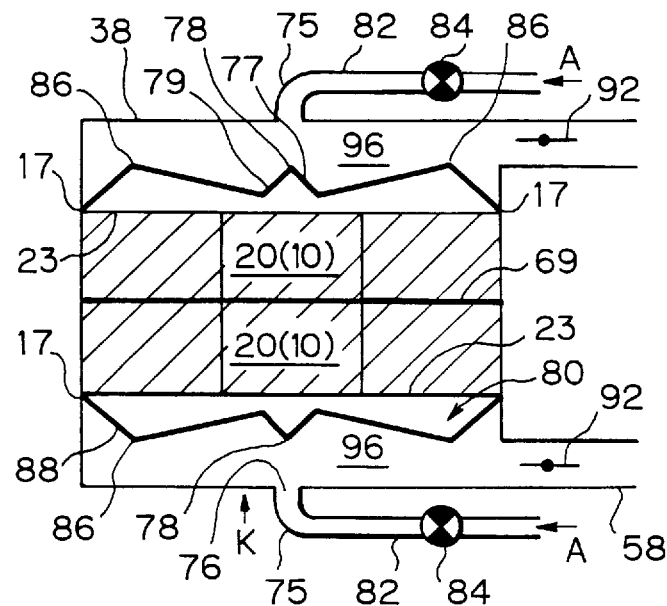
FIG. 5B is a longitudinal horizontal sectional view of the system shown in FIG. 5A.

The present invention will be described below in detail with reference to FIGS. 5A to 10, which show embodiments of the present invention. In these figures, constituent elements similar to those in the prior arts shown in FIGS. 1 to 4B are denoted by the same reference characters, and a redundant description is omitted. FIG. 5A is a longitudinal vertical sectional view schematically showing a filter regenerating mechanism for an exhaust black smoke removing system using a cross-flow filter according to an embodiment of the present invention. FIG. 5B is a longitudinal horizontal sectional view of the system shown in FIG. 5A. The exhaust black smoke removing system shown in FIG. 5B includes a filter 20 having three cross-flow filter blocks 10 as shown in FIG. 1, which are disposed on each side of a partition plate 69. Each filter block 10 used in the embodiment shown in FIGS. 5A and 5B has a structure similar to that shown in FIG. 1.

In FIGS. 5A and 5B, exhaust gas discharged from a diesel engine enters an inlet chamber 62 through an exhaust inlet pipe 57 and flows successively through filter inlet surfaces 12, first passages, a gas-permeable porous material (e.g. ceramic material) lying between the first and second passages, second passages, gas outlet surfaces 23, exhaust chambers 96, and exhaust outlet pipes 58. Thus, particulates in the exhaust gas are deposited on the wall surfaces of the first passages. The first passages extend from the inlet surfaces 12 to particulate discharge surfaces 13. The particulate discharge surfaces 13 are communicated with a hopper 68 and prevent exhaust gas from passing therethrough. Accordingly, the exhaust gas coming out of the first passages passes through the gas-permeable porous material and further passes through the second passages to flow into the exhaust chambers 96 through the outlet surfaces 23. Particulates of large diameter in the exhaust gas cannot pass through the ceramic material; therefore, these particulates are deposited on the wall surfaces of the first passages 14 and thus removed from the exhaust gas. Consequently, only dedusted exhaust gas is discharged from the gas outlet surfaces 23.

The system is arranged such that cleaning air A can be supplied from a compressed air tank (not shown) of 8 kg/cm$^2$, for example, into the exhaust chambers 96 through solenoid valves 84, air pipes 82, and air nozzles 75. Each time exhaust gas is passed for a predetermined period of time, the solenoid valves 84 are opened for an extremely short period of time, thereby allowing compressed air to jet out from the air nozzles 75 and to flow in a direction reverse to the flow direction of exhaust gas, that is, through the exhaust chambers 96, the exhaust gas outlet surfaces 23, the second passages, the gas-permeable porous material lying between the first and second passages, and the first passages. Consequently, the particulates deposited on the wall surfaces of the first passages are removed from the wall surfaces by the action of pressure waves and cleaning air stream produced as a result of the opening of the solenoid valves 84, and drop into the hopper 68 by gravity. Thus, the filter is regenerated by reverse cleaning. The particulates dropping into the hopper 68 are incinerated by heat from an ignition heater 66 or by combustion air (not shown) supplied into the hopper 68.

As shown in FIGS. 5A and 5B, the air nozzles 75 are provided to open toward the filter outlet surfaces 23, respectively. The opening of each air nozzle 75 is disposed such that the center of the opening faces opposite to the center of the associated outlet surface 23. A perforated plate 80 is disposed between each air nozzle 75 and the outlet surface 23 associated with it so as to cover the outlet surface 23. As is clearly shown in FIGS. 6 and 7, the perforated plate 80 has a first projection 78 projecting toward the opening of the air nozzle 75, and two second projections 86 projecting toward the air nozzle 75 from respective positions near opposing edges 17 of the outlet surface 23. The first projection 78 has a first slant surface 77 and a second slant surface 79, which have approximately symmetric cross-sections. Each second projection 86 has a third slant surface 87 closer to the first projection 77, and a fourth slant surface 88 closer to an edge 17 of the outlet surface 23.

Figure 6:
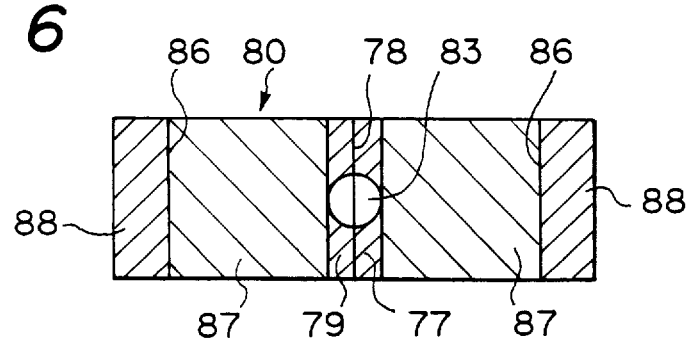
FIG. 6 is a side view of a perforated plate as seen from the direction of the arrow K in FIG. 5B.

A lower end of the first slant surface 77 is connected to a lower end of the third slant surface 87 adjacent to the first slant surface 77, and a lower end of the second slant surface 79 is connected to a lower end of the third slant surface 87 adjacent to the second slant surface 79. A lower end of each fourth slant surface 88 is connected to that edge 17 of the outlet surface 23 which is adjacent to the fourth slant surface 88. As shown in FIG. 6, a portion of the first and second slant surfaces 77 and 79 which faces opposite to the air nozzle 75 and has a predetermined radius is defined as a non-perforated portion 83 having an opening ratio of substantially 0%. The remaining portion of the perforated plate 80 is provided with a large number of holes having a predetermined diameter. Those portions of the first and second slant surfaces 77 and 79 which are outside the non-perforated portion 83, together with the fourth slant surfaces 88, each have an opening ratio of about 10%, which is lower than the opening ratio of the third slant surfaces 87, i.e. 60%.

Figure 7:
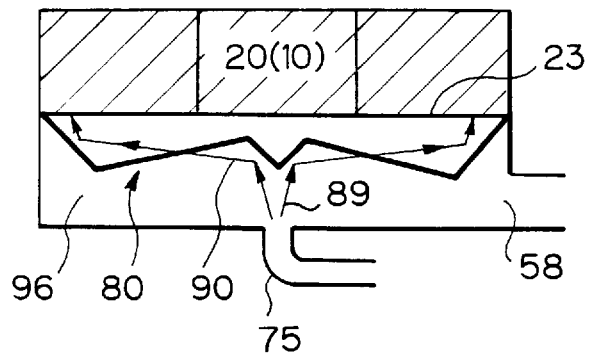
FIG. 7 is a fragmentary longitudinal horizontal sectional view schematically showing the way in which pressure waves are reflected by the perforated plate.

FIG. 7 shows a cross-section of the perforated plate 80 and also shows schematically the way in which pressure waves produced upon opening of the solenoid valve 84 are transmitted from the air nozzle 75 toward the filter outlet surface 23, and on their way to the outlet surface 23, the pressure waves are reflected and dispersed by the perforated plate 80 so as to be substantially uniformly distributed over the whole outlet surface 23. The opening of the air nozzle 75 has a diameter of about 20 mm to 30 mm, which is much smaller than the size of the filter outlet surface 23. Therefore, pressure waves transmitted from the air nozzle 75 tend to be distributed to only a narrow area on the outlet surface 23. However, the provision of the perforated plate 80 enables the pressure waves to be favorably distributed over the whole outlet surface 23.

As shown in FIG. 7, pressure waves 89 transmitted from the air nozzle 75 first collide against the first projection 78 and are reflected and diffused by the first and second slant surfaces 77 and 79 to become pressure waves 90 extending over a wide area. Then, the pressure waves 90 pass through a large number of small holes of diameter about 5 mm in the perforated plate 80, thereby being rectified and dispersed uniformly over a wide area, as will be described later with reference to FIG. 8. A part of the pressure waves 90 are further reflected by the fourth slant surface 88, thus becoming uniform pressure waves directed toward the whole outlet surface 23. The perforated plate 80 not only uniformly distributes pressure waves as described above but also rectifies a stream of cleaning air through a large number of small holes so that the air stream is uniformly dispersed over the whole outlet surface 23.

Figure 9:
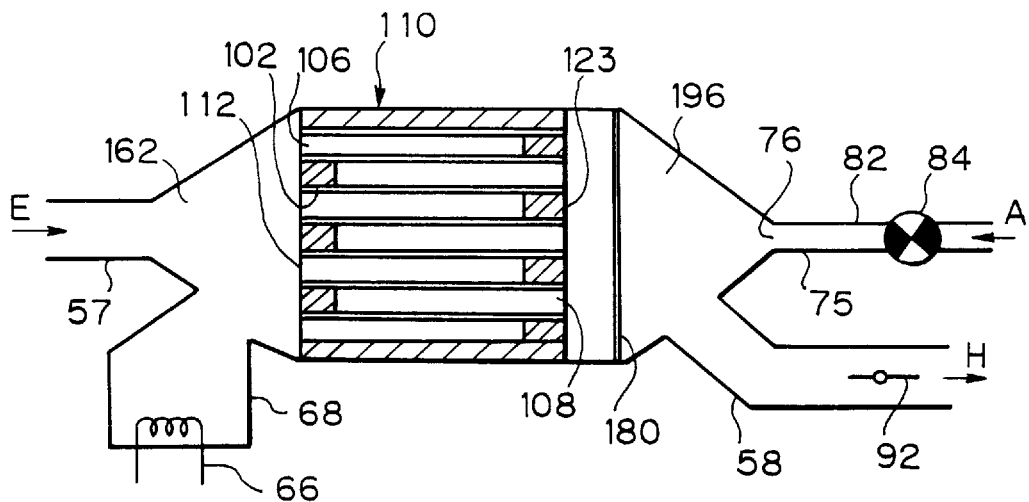
FIG. 9 is a longitudinal vertical sectional view of an exhaust black smoke removing system using a honeycomb filter according to an embodiment of the present invention.

FIG. 9 shows an exhaust black smoke removing system using a filter 110 consisting essentially of a honeycomb cylindrical member made of a gas-permeable porous material. The filter 110 is similar to the filter shown in FIGS. 4A and 4B. In the system shown in FIG. 9, exhaust gas discharged from a diesel engine flows successively through an exhaust inlet pipe 57, an inlet chamber 162, a filter inlet surface 112, first cells 106, partitions 102 made of a gas-permeable porous material and lying between the first and second cells 106 and 108, second cells 108, an outlet surface 123, an exhaust chamber 196, an exhaust outlet pipe 58, and an exhaust valve 92. Thus, particulates in the exhaust gas are deposited on the wall surfaces (partitions 102) of the first cells 106.

The exhaust black smoke removing system shown in FIG. 9 is arranged such that cleaning air A can be supplied from a compressed air tank (not shown) of 8 kg/cm$^2$, for example, into the exhaust chamber 196 through a solenoid valve 84, an air pipe 82, and an air nozzle 75. Each time exhaust gas is passed through the filter 110 for a predetermined period of time, the solenoid valve 84 is opened for an extremely short period of time, thereby allowing compressed air to be supplied into the exhaust chamber 196 through the air nozzle 75. The compressed air passes through a perforated plate 180 parallel to the filter outlet surface 123 and then flows through a path reverse to the path of exhaust gas. Consequently, the particulates deposited on the wall surfaces of the first cells 106 are removed therefrom by the action of pressure waves and cleaning air system produced as a result of the opening of the solenoid valve 84, and drop by gravity into a hopper 68 communicated with the bottom of the inlet chamber 162. Thus, the filter 110 is regenerated by reverse cleaning. The particulates dropping into the hopper 68 are incinerated by heat from an ignition heater 66 or by combustion air (not shown) supplied into the hopper 68.

Figure 10:
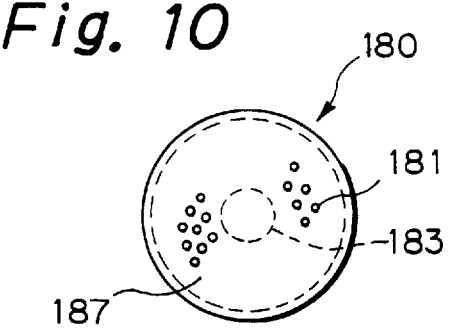
FIG. 10 is a side view of a perforated plate used in the system shown in FIG. 9.

As shown in FIG. 10, the perforated plate 180 of the exhaust black smoke removing system shown in FIG. 9 has a non-perforated portion 183 (with an opening ratio of approximately 0%) of predetermined radius which faces opposite to the opening center 76 of the air nozzle 75. The perforated plate 180 further has an annular portion 187 lying outside the non-perforated portion 183 and a predetermined distance inward of the outer periphery of the perforated plate 180. The annular portion 187 has a large number of small holes 181 having a diameter of about 5 mm. The annular portion 187 has an opening ratio of the order of 50%. Cleaning air supplied from the air nozzle 75 passes through the large number of small holes 181 of the annular portion 187, with the central strong air stream being blocked by the non-perforated portion 183, thereby being rectified and dispersed to act on the filter outlet surface 123 in the form of substantially uniform air streams.

Figure 8:
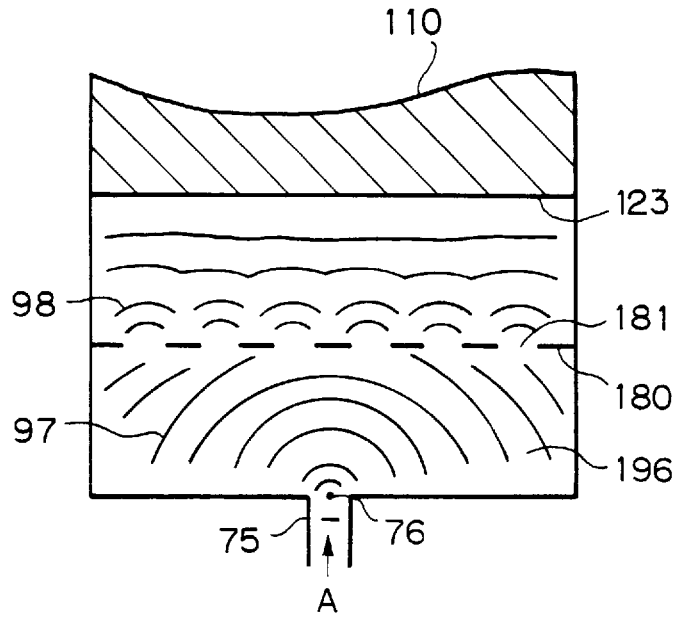
FIG. 8 is a fragmentary horizontal sectional view of an exhaust black smoke removing system to describe the wave rectifying action of the perforated plate.

FIG. 8 shows schematically the way in which pressure waves (longitudinal waves), which are produced upon opening of the solenoid valve 84 to act on the filter through the opening of the air nozzle 75, are rectified through the small holes 181 of the perforated plate 180 so as to act on the filter outlet surface 123 substantially uniformly. Pressure waves, which are propagated in the form of spherical wavefronts 97 from the opening of the air nozzle 75 in the exhaust chamber 196, are blocked by the perforated plate 180, and in the space between the perforated plate 180 and the filter outlet surface 123, the pressure waves become wavefronts propagated from the large number of small holes 181 of the perforated plate 180. Wavefronts from the large number of small holes 181 of the perforated plate 180 are propagated in the form of wavefronts 98 which are surfaces parallel to the perforated plate 180 on Huygens' principle. Therefore, in the system shown in FIG. 9, the perforated plate 180 is a planar member disposed approximately parallel to the filter outlet surface 123. Thus, pressure waves from the air nozzle 75 are propagated in the form of plane waves and thus capable of being applied to the filter outlet surface 123 substantially uniformly.

Thus, in the system shown in FIG. 9, air streams passing through the perforated plate 180 act on the filter outlet surface 123 substantially uniformly, and pressure waves act on the whole filter substantially uniformly. Therefore, it is possible to sweep particulates from the whole filter. In the system shown in FIGS. 5A to 7, pressure waves are also distributed over the outlet surfaces 23 substantially uniformly by the action of a large number of small holes of the perforated plates 80, thereby enabling particulates to be swept from the whole filter in cooperation with the action of air streams passing through the whole filter.

In the embodiments shown in FIGS. 5A to 10, the filter regeneration rate, which is expressed by (the weight of particulates swept from the filter by the reverse cleaning process)÷(the weight of particulates deposited in the filter before the reverse cleaning process), is about 97%, whereas the filter regeneration rate of the conventional system is about 78%. Thus, the filter regeneration rate can be improved to a considerable extent. Moreover, the same filter regeneration rate as in the prior art can be attained by an air injection quantity about half the air injection quantity required in the prior art.

(Effect of the Invention)

In the filter regenerating mechanism for an exhaust black smoke removing system according to the present invention, a perforated plate having a large number of small holes is disposed between an air nozzle for jetting out cleaning air and a filter outlet surface so as to cover the filter outlet surface. Therefore, a stream of air jetted out from the air nozzle is rectified and diffused by the perforated plate so as to be sprayed in the form of a wide stream over the whole filter outlet surface substantially uniformly. Pressure waves produced upon opening of a solenoid valve for compressed air supply are reflected and diffused by the perforated plate so as to act effectively on the whole filter outlet surface in the form of substantially plane waves.

According to the present invention, no heat load is imposed on the filter, and no ash remains. Therefore, the lifetime of the filter can be increased. Further, particulates can be efficiently removed from the wall surfaces of the first passages in the whole filter. Accordingly, it is possible to reduce the filter pressure loss due to residual particulates. Moreover, the cleaning air injection quantity can be reduced by the improvement in the efficiency of cleaning air.

The perforated plate used in the filter regenerating mechanism according to the present invention is provided with projection and slant surfaces, thereby rectifying a stream of air jetted out from a small air nozzle and also rectifying and reflecting pressure waves so that the air stream and pressure waves are dispersed over a wide area. Accordingly, air streams and pressure waves can be uniformly applied entirely to a wide filter outlet surface as in the case of using a large number of cross-flow filters and also to a wide outlet surface of a conventional large-sized filter (honeycomb filter), and thus particulates can be removed from the whole filter.

The filter regenerating mechanism for an exhaust black smoke removing system according to the present invention enables a stream of air to be spread over the whole filter outlet surface without a need of a large dimension between the air nozzle and the filter outlet surface. Therefore, the exhaust black smoke removing system can be constructed in a compact structure; this is convenient for mounting on vehicles. The present invention improves the filter regeneration rate of an exhaust black smoke removing system and reduce the pressure loss of exhaust gas due to passage through the filter. Therefore, it is possible to minimize the reduction in the output of a diesel engine due to the exhaust black smoke removing system. Further, the filter regenerating mechanism according to the present invention has a relatively simple structure characterized by providing a perforated plate. Therefore, the filter regenerating mechanism can be readily produced and is unlikely to fail. Accordingly, a stable operation is available for a long period of time, and the costs of production and maintenance are favorably low.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A filter regenerating mechanism for an exhaust black smoke removing system of the type wherein a filter made of a gas-permeable porous material has a plurality of first passages extending between an inlet surface and a particulate discharge surface, and a plurality of second passages extending between the first passages and opening on an outlet surface, and wherein exhaust gas discharged from a diesel engine flows successively through the filter inlet surface, the first passages, the gas-permeable porous material lying between the first and second passages, the second passages, and the outlet surface, so that particulates in the exhaust gas are deposited on wall surfaces of the first passages, and wherein cleaning air is supplied to flow in a direction reverse to a flow direction of the exhaust gas, thereby removing the deposited particulates from the wall surfaces of the first passages and allowing the removed particulates to drop into a hopper where they are incinerated, and thus regenerating the filter, said filter regenerating mechanism characterized by:
an air nozzle for supplying cleaning air, said air nozzle opening toward said outlet surface of said filter;
an air injection valve for injecting cleaning air into said air nozzle; and
a perforated plate disposed between said air nozzle and said outlet surface so as to cover said outlet surface;
said perforated plate having a large number of small holes to distribute cleaning air and pressure waves over the whole outlet surface substantially uniformly.

2. A filter regenerating mechanism according to claim 1, wherein said perforated plate has a first projection projecting toward an opening of said air nozzle, and two second projections projecting toward said air nozzle from respective positions in vicinities of opposing edges of said outlet surface, said first projection having a first and second slant surfaces having approximately symmetric cross-sections, said second projections each having a third slant surface closer to said first projection and a fourth slant surface closer to an edge of said outlet surface, and wherein a portion of each of said first and second slant surfaces which faces opposite to said air nozzle and has a predetermined radius is defined as a non-perforated portion having an opening ratio of approximately 0%, and the remaining portion of said perforated plate is provided with a large number of holes having a predetermined diameter, and wherein those portions of said first and second slant surfaces which are outside said non-perforated portion, together with said fourth slant surfaces, each have an opening ratio lower than an opening ratio of said third slant surfaces.

3. A filter regenerating mechanism according to claim 2, wherein said filter comprises a plurality of filter blocks disposed on each side of a partition plate, and the opening of said air nozzle is disposed such that a center of said opening faces opposite to approximately a center of said outlet surface, and wherein those portions of said first and second slant surfaces which are outside said non-perforated portion, together with said fourth slant surfaces, each have an opening ratio of about 10%, and said third slant surfaces have an opening ratio of about 60%.

4. A filter regenerating mechanism for an exhaust black smoke removing system of the type wherein a filter made of a gas-permeable porous material has a plurality of first passages extending parallel from an inlet surface, and a plurality of second passages extending between the first passages and opening on an outlet surface, and wherein exhaust gas flows successively through the filter inlet surface, the first passages, the gas-permeable porous material lying between the first and second passages, the second passages, and the outlet surface, so that particulates in the exhaust gas are deposited on wall surfaces of the first passages, and wherein cleaning air is supplied to flow in a direction reverse to a flow direction of the exhaust gas, thereby removing the deposited particulates from the wall surfaces of the first passages and allowing the removed particulates to drop into a hopper where they are incinerated, and thus regenerating the filter, said filter regenerating mechanism characterized by:
an air nozzle opening toward said outlet surface;
an air injection valve for injecting cleaning air into said air nozzle; and
a perforated plate approximately parallel to said outlet surface;
wherein a portion of said perforated plate which faces opposite to said air nozzle and has a predetermined radius is defined as a non-perforated portion having an opening ratio of approximately 0%, and an annular portion lying outside said non-perforated portion and a predetermined distance inward of an outer periphery of said perforated plate is provided with a large number of holes.

5. A filter regenerating mechanism according to claim 4, wherein said filter is in a shape of a cylinder having an axis parallel to said first passages, and said inlet and outlet surfaces are circular planes perpendicular to said axis, and wherein said annular portion has an opening ratio of 50%.

* * * * *